(12) United States Patent
Stolt et al.

(10) Patent No.: US 8,375,076 B2
(45) Date of Patent: Feb. 12, 2013

(54) APPARATUS AND METHOD FOR DETERMINING RESOLVER ANGLE

(75) Inventors: Lauri Stolt, Helsinki (FI); Tuukka Kauppinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 748 days.

(21) Appl. No.: 12/540,802

(22) Filed: Aug. 13, 2009

(65) Prior Publication Data
US 2009/0300090 A1     Dec. 3, 2009

Related U.S. Application Data

(63) Continuation of application No. PCT/FI2008/000006, filed on Jan. 17, 2008.

(30) Foreign Application Priority Data

Mar. 14, 2007 (FI) .................................... 20070207

(51) Int. Cl.
G06F 7/38 (2006.01)
G06F 17/10 (2006.01)
(52) U.S. Cl. .......................... 708/441; 708/320; 708/440
(58) Field of Classification Search .................... 708/441
See application file for complete search history.

(56) References Cited

U.S. PATENT DOCUMENTS

| | | | | |
|---|---|---|---|---|
| 4,776,014 A * | 10/1988 | Zinser, Jr. | ...................... | 704/262 |
| 5,485,407 A * | 1/1996 | Ishimoto et al. | ................ | 702/94 |
| 6,255,794 B1 * | 7/2001 | Staebler | ........................ | 318/605 |
| 2003/0183423 A1 | 10/2003 | Brazil et al. | | |
| 2004/0104704 A1 | 6/2004 | Hirono | | |
| 2004/0130707 A1 | 7/2004 | Johnston et al. | | |
| 2005/0067995 A1 | 3/2005 | Weinhofer et al. | | |

OTHER PUBLICATIONS

Martin Staebler, "TMS320F240 DSP Solution for Obtaining Resolver Angular Position and Speed", Feb. 2000, Texas Instruments, Application Report SPRA605, chapters 3-3.2.5.

* cited by examiner

*Primary Examiner* — Henry Tsai
*Assistant Examiner* — Dean Phan
(74) *Attorney, Agent, or Firm* — Birch, Stewart, Kolasch & Birch, LLP

(57) ABSTRACT

The invention concerns a method and apparatus (28) for determining an angle (9) by means of a resolver (3). In the method, an excitation signal (29) of constant frequency is supplied to the resolver (3), the resolver response signals (13, 14) are measured, successive (16) measurements of each response signal are stored into a sample buffer (5), FIR filtering (10) is computed for the response signal values (16) present in the sample buffer (5) at the instant of computation, the computation points (23, 24) and the set of computation result values (18) corresponding to these points are stored in memory, at least two sets of values (18, 19) of computation results are compared to each other and of these the value set Amax (19) which contains the highest computation result as an unsigned value is selected, and FIR filtering (10) is repeatedly computed at the computation points (25, 26) corresponding to value set Amax (19).

11 Claims, 4 Drawing Sheets

APPARATUS AND METHOD FOR DETERMINING RESOLVER ANGLE

This application is a Continuation of PCT International Application No. PCT/FI2008/000006 filed on Jan. 17, 2008, and claims priority under 35 U.S.C. §119(a) on Patent Application No. 20070207 filed in Finland on Mar. 14, 2007, all of which are hereby expressly incorporated by reference into the present application.

FIELD OF THE INVENTION

The present invention relates to a method as defined in the preamble of claim 1 and to an apparatus as defined in the preamble of claim 4 for determining an angle by means of a resolver.

PRIOR ART

In this context, resolver means generally a device having at least one input for an excitation signal and at least two outputs for response signals. Both the excitation and the response signals are AC signals. The response signals change as the primary and secondary of the resolver are displaced relative to each other. The angle between the primary and the secondary can be determined by means of the response signals, for example by using a prior-art trigonometric function.

A generally used transformer-type resolver has one input on the primary side and two outputs on the secondary side. The resolver primary has a magnetizing winding, which is supplied with an alternating current of constant amplitude and frequency as an excitation signal. The secondary contains two windings, which are disposed in the magnetic circuit perpendicularly relative to each other in such manner that the response to the excitation signal appears in an amplitude-modulated form in the voltages induced in the secondary windings, with a phase difference of 90 degrees due to the perpendicular disposition of the windings. The angle between the primary and secondary windings is determined on the basis of the amplitude differences between the secondary signals. As the phase difference between the signals in this resolver is 90 degrees, the amplitudes of the signals correspond directly to the sine and cosine of the angle between the primary and secondary windings, and the angle can be determined from these signals e.g. by using the arcus tangent function.

To allow accurate determination of the angle, it is necessary to filter the secondary signals to remove all disturbances from them. These include e.g. a DC voltage added to the signals, and distortion. The disturbances can be eliminated e.g. by filtering the signals with a suitable analog or digital filter.

In many servo drives, very accurate angle measurement is required. This presents challenges to the filtering. In practice, a filter is needed that has a filter order of at least over 10, often over 20. Constructing such a filter by analog technology is possible, but the result is a complicated filter, which increases the costs of the system. Moreover, the temperature drift and similar defects of analog components impair the filtering result.

In practice, the response signals of a resolver are filtered using microprocessors. For example, specification U.S. Pat. No. 6,255,794 B1 discloses a method for determining a resolver angle wherein the response signals are filtered using a FIR (Finite Impulse Response) band-pass filter. An implementation like this involves the problem that the high-order FIR filter requires a very great deal of processor computing power. To visualize this circumstance, FIG. 3 shows the construction of an eighth-order FIR filter. The algorithm of the filter in the figure is of the form:

$$y_n = a_0 x_n + a_1 x_{n-1} + \ldots + a_8 x_{n-8}$$

The filter is computed each time a new value $x_n$ is received in the sample buffer. As the sample buffer is updated at a high frequency, the algorithm also has to be computed at a high frequency. Computing the eighth-degree filter presented in the figure requires nine addition and multiplication operations each time the sample buffer is updated. As it is often necessary to use a $20^{th}$-order filter to obtain a good filtering result, a long and heavy computing algorithm is involved, consuming most of the processor computing power.

Specifications "Martin Staebler, TMS320F240 DPS Solution for Obtaining Resolver Angular Position and Speed, Texas Instruments, Application report SPRA605, February 2000"; U.S. Pat. No. 6,255,794 B; and "A. O. Di Tommaso, R. Miceli, A new high accuracy software based resolver-to-digital converter, Proc. of Industrial Electronics Society, 2003. IECON '03, The $29^{th}$ Annual Conference of the IEEE, 2-6 Nov. 2003, pp. 2435-2440"; describe methods and apparatus in which a resolver output signal is subjected to FIR filtering. However, determining the resolver angle in the manner described in the above specifications requires plenty of computing power, which is why the methods and apparatus proposed are expensive and complicated to implement.

OBJECT OF THE INVENTION

The object of the present invention is to disclose a method and apparatus by means of which a resolver angle can be determined accurately by less computation than in prior art.

FEATURES OF THE INVENTION

The method of the invention for determining a resolver angle is characterized by what is stated in the characterizing part of claim 1. The apparatus of the invention for determining a resolver angle is characterized by what is stated in the characterizing part of claim 4. Other embodiments of the invention are characterized by what is disclosed in the other claims. Inventive embodiments are also presented in the description part of the present application. The inventive content disclosed in the application can also be defined in other ways than is done in the claims below. The inventive content may also consist of several separate inventions, especially if the invention is considered in the light of explicit or implicit subtasks or with respect to advantages or sets of advantages achieved. In this case, some of the attributes contained in the claims below may be superfluous from the point of view of separate inventive concepts. The features of different embodiments of the invention can be applied in connection with other embodiments within the scope of the basic inventive concept.

In an embodiment of the invention, the resolver has an input for an excitation signal and at least two outputs for response signals. In a method according to the invention for determining an angle by means of a resolver, an excitation signal of essentially constant frequency is supplied to the resolver; the resolver response signals are measured; FIR filtering is computed for the measured response signal values, and the computation points and the corresponding set of values A1 of computation results are stored in memory; each computation point is shifted at least once relative to the excitation signal, the new computation points and the new set of values of computation results are stored in memory; at least two sets of values An of computation results are compared to each other and of these the value set Amax which contains the highest computation result as an unsigned value is selected; and FIR filtering is repeatedly computed at predetermined computation points corresponding to value set Amax, and angle data is determined from the computation results.

In a method according to the invention for determining an angle by means of a resolver, an excitation signal of constant frequency is supplied to the resolver; the resolver response signals are measured at predetermined, evenly distributed intervals; successive measurements of each response signal are stored into a sample buffer; FIR filtering is computed for the response signal values present in the sample buffer at the instant of computation at even intervals in such manner that each computation point is synchronized with the excitation signal, and the computation points and the set of values A1 of computation results corresponding to these points are stored in memory; each computation point is shifted equally relative to the excitation signal in such manner that the new computation points are synchronized with the excitation signal, the new computation points and the new set of values of computation results are stored in memory; the shifting of computation points is repeated and the new computation points as well as the values in the sets An of values computed at these points are stored in memory; at least two sets of values An of computation results are compared to each other and of these the value set Amax which contains the highest computation result as an unsigned value is selected; and FIR filtering is repeatedly computed at predetermined computation points corresponding to value set Amax, and angle data is determined from the computation results.

In a method according to the invention, FIR filtering is computed at two computation points within the excitation-signal cycle time for the values present at the instant of computation in a sample buffer having a length at least equal to the excitation-signal cycle time; in each value set An, averages are computed for the unsigned values in the value sets in question; and the averages computed for different sets of values An are compared to each other, the value set Amax corresponding to the highest average is selected and FIR filtering is repeatedly computed at two predetermined computation points corresponding to value set Amax.

In a method according to the invention, each point of computation of the FIR filter is synchronized with the excitation signal by defining the frequency of computations as the excitation signal frequency or a multiple of the excitation signal frequency.

An apparatus according to the invention for determining an angle by means of a resolver comprises an excitation signal generator, a response signal sampler, a FIR filter, means for determining the instant of computation of FIR filtering, means for changing the instant of computation of FIR filtering, a memory for storing the computation points and value sets An, a comparator for comparing the unsigned values in the value sets, and in connection with the comparator a selector for selecting a value set, and a determiner of angle data.

An apparatus according to the invention for determining an angle by means of a resolver comprises a response-signal sample buffer.

An apparatus according to the invention comprises a controller, which comprises a system clock, a central processing unit, a RAM memory, a non-volatile program memory and a non-volatile memory for the computation points of at least one set of values, a sampler and an A/D converter.

In an apparatus according to the invention, the excitation signal generator, the FIR filter, the means for determining the instant of computation of FIR filtering, the means for changing the instant of computation of FIR filtering, the comparator of value sets and in connection with the comparator the selector for selecting a value set as well as the determiner of angle data are implemented via software, and in this implementation both the sample buffer and the memory for storing the computation points and value sets An are in RAM memory.

In an apparatus or method according to the invention, the aforesaid FIR filter is a FIR band-pass filter.

'Resolver according to the invention' refers generally to a device having at least one input for an excitation signal and at least two outputs for response signals. Both the excitation and response signals are AC signals. The response signals change when the resolver primary and secondary move relative to each other.

The angle between the primary and secondary can be determined from the response signals, e.g. by using a prior-art trigonometric function.

In the method of the invention, 'sample buffer' refers to a buffer in which the successive response signal measurements, i.e. samples, are stored. For each response signal, a separate buffer is provided. The buffer contains the samples in chronological order such that, each time a new sample is entered into the buffer, the oldest sample is deleted.

'Computation point' refers to the instant of time at which the computation takes place and which is synchronized with the excitation signal. The computation points are synchronized with the excitation signal by selecting a computation frequency that is equal to, or a multiple of, the frequency of the fundamental wave of the excitation signal. The response-signal measurement frequency, i.e. the sampling frequency, is likewise synchronized with the excitation signal. The sampling frequency is always at least equal to the frequency of computations. 'Measurement points' means the measurement instants of time synchronized with the excitation signal. The distance between two measurement points is called measurement interval. The resolver response signals are measured at predetermined, evenly distributed intervals, which is to say that the measurement points are synchronized with the excitation signal and the measurement interval is constant.

In the method of the invention, the measurement points for the computation of a new set of values An is always shifted by at least one measurement interval.

Using the method of the invention, it is possible to determine those computation points at which the filtering resolution is essentially best. As the computation points are selected from sets of values of filtered response signals, possible phase differences between the filtered response signals and the excitation signal or signals are compensated. A phase difference is produced e.g. in the FIR filter and in the electronics used to measure the response signals. As the points of computation of the filtering are predetermined, they need not be continuously determined, but the filtering is computed repeatedly at these same predetermined computation points corresponding to value set Amax. The determination of computation points can be repeated when necessary, e.g. once a day or less frequently.

In a method according to the invention, filtering is computed twice during the excitation-signal cycle time. After this, an average is computed for the unsigned values in each value set An computed, and value set Amax is selected by comparing the averages computed for different value sets. As value set Amax, the one of the value sets is selected for which the computed average is highest.

In an apparatus according to the invention, a constant-frequency excitation signal is produced in an excitation signal generator from an amplitude reference as a function of smoothly changing excitation-signal angle data. In another apparatus according to the invention, the excitation signal is produced in an excitation signal generator from an amplitude reference as a function of time.

In an apparatus according to the invention, the means for determining the instant of computation of FIR filtering comprise at least a value set comparator, by means of which the different value sets An are compared to each other and of these a value set and the corresponding FIR-filtering computation points are selected. Said means may additionally comprise a memory in which the computation points and the corresponding value sets are stored for comparison, and a non-volatile memory for the storage of the computation points selected as a result of the comparison.

The apparatus of the invention for determining an angle by means of a resolver can be formed from discrete components, including at least an excitation signal generator, a response signal sampler, a sample buffer, a FIR filter, means for determining the instant of computation of FIR filtering, means for changing the instant of computation of FIR filtering, a memory for storing the computation points and value sets An, a value set comparator and an angle data determiner. The apparatus of the invention can also be constructed using a prior-art microcontroller known in itself, in which case the aforesaid components of the apparatus are implemented via software.

ADVANTAGES OF THE INVENTION

When the response signals are filtered by the method of the invention, the filtering function can be computed only at desired computation points synchronized with the excitation signal. Since the filtering function is a multi-step function and consequently requires a great deal of processor computing power, a smaller and cheaper processor can be used, or alternatively the remaining extra computation time of the processor can be utilized for other system control tasks, the structure of the system being thus simplified.

In the method of the invention, the response-signal sampling frequency can be further increased, and likewise the length of the sampling buffer can be increased as this does not require a large amount of processor computation capacity. The increased length of the sampling buffer allows the filtering order to be further increased, the filtering accuracy being thereby improved. The more the filtering order and sampling buffer length are increased, the greater will be the advantage provided by the resolver filtering method of the invention as compared to prior art. For example, if the sampling buffer has a length equal to the excitation signal cycle, comprising ten samples, filtering can be computed e.g. twice during the excitation-signal cycle time by the method of the invention, whereas in prior art the filtering is computed ten times during the cycle time. Again, if the sampling buffer length for the excitation-signal cycle time is 100 samples, then in prior art the filtering is computed 100 times during the cycle, whereas by the method of the invention the filtering can still be computed only twice during the cycle, which emphasizes the advantage regarding computing power.

EMBODIMENT EXAMPLES

Figure 1:
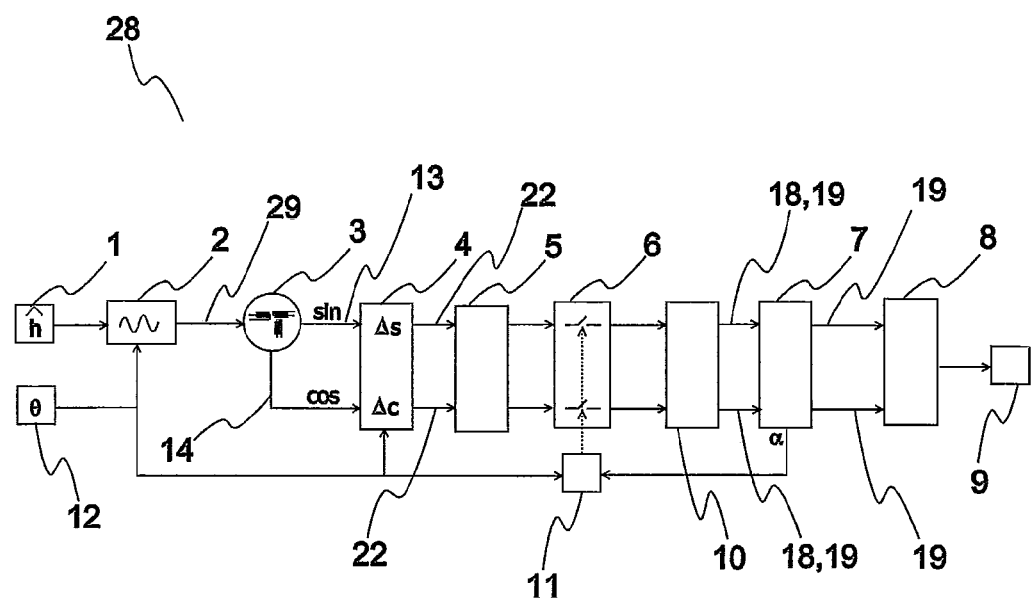
FIG. 1 represents an apparatus according to the invention
Figure 4:
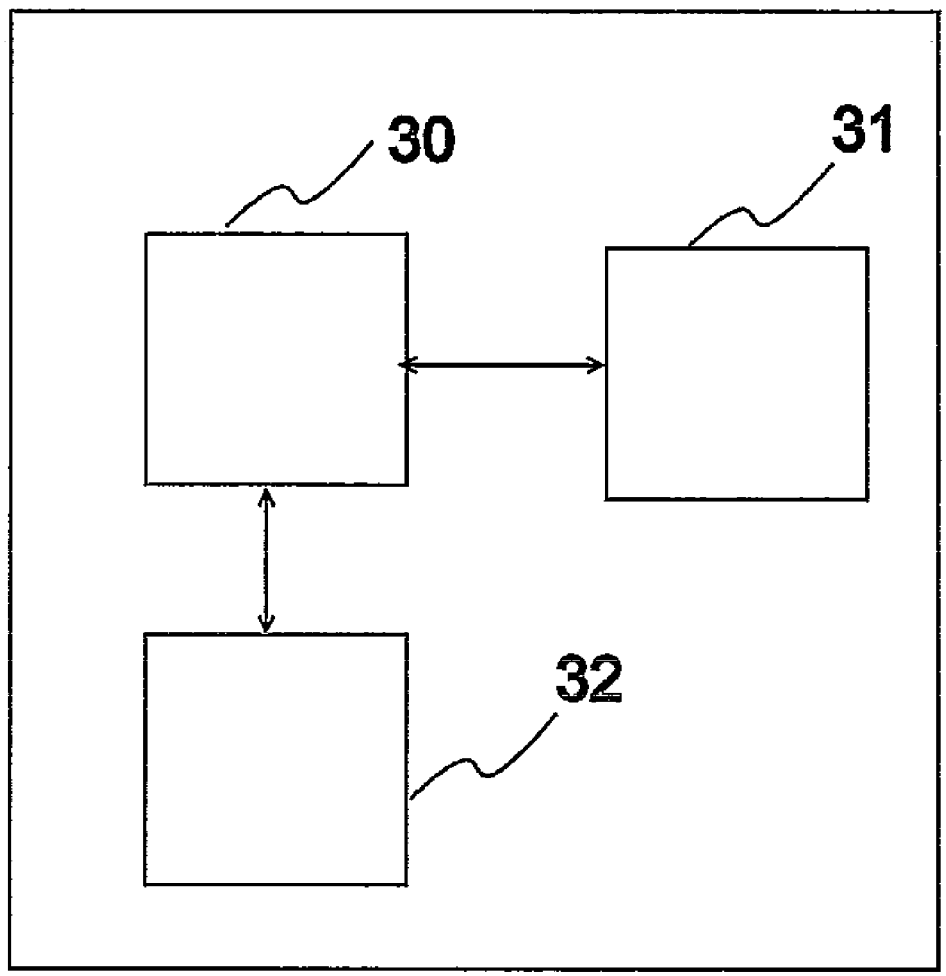
FIG. 4 represents means according to the invention for determining the instant of computation of FIR filtering.

FIG. 1 represents an apparatus (28) for determining an angle by means of a resolver. A resolver excitation signal (29) is produced in an excitation signal generator (2) as a function of amplitude (1) and angle (12). The response signals (13, 14) are read by a sampler (4) and stored into a sample buffer (5). FIR band-pass filtering (10) is only computed at predetermined instants of time, i.e. computation points, and the instant of computation is determined by means (6, 11) for changing the instant of computation. In this embodiment of the invention, these means (6, 11) comprise a threshold circuit (6) and a threshold circuit controller (11), but in a preferred embodiment of the invention FIR filtering is performed via software by a microcontroller and the FIR filter (10) is a function which is invoked by software and whose invocation initiates FIR filtering. The apparatus in FIG. 1 additionally comprises means (7) for determining the instant of computation of FIR filtering. These means may comprise a memory (30) as shown in FIG. 4 for storing the computation points (23, 24, 25, 26) and value sets An (18, 19), a value set comparator (31) and an angle data determiner (8). The value set comparator compares the value sets (18, 19) computed at different computation points and selects the one of the value sets which contains the highest computation result or the highest average of computation results. In addition, the apparatus according to FIG. 1 comprises an angle data determiner (8), which computes the angle data (9) from the FIR-filtered resolver response signals.

Figure 2:
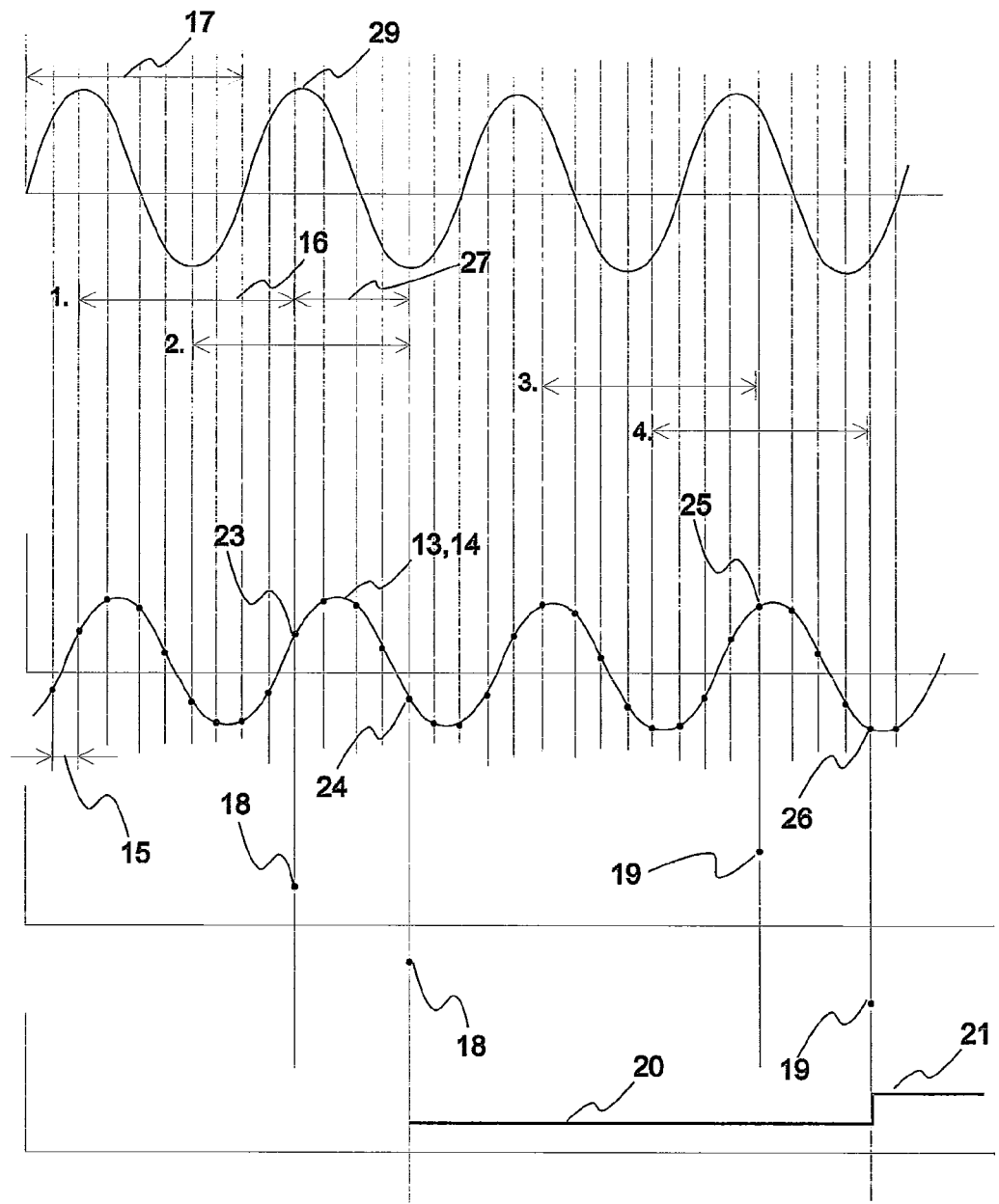
FIG. 2 represents a timing diagram used in a method according to the invention
Figure 3:
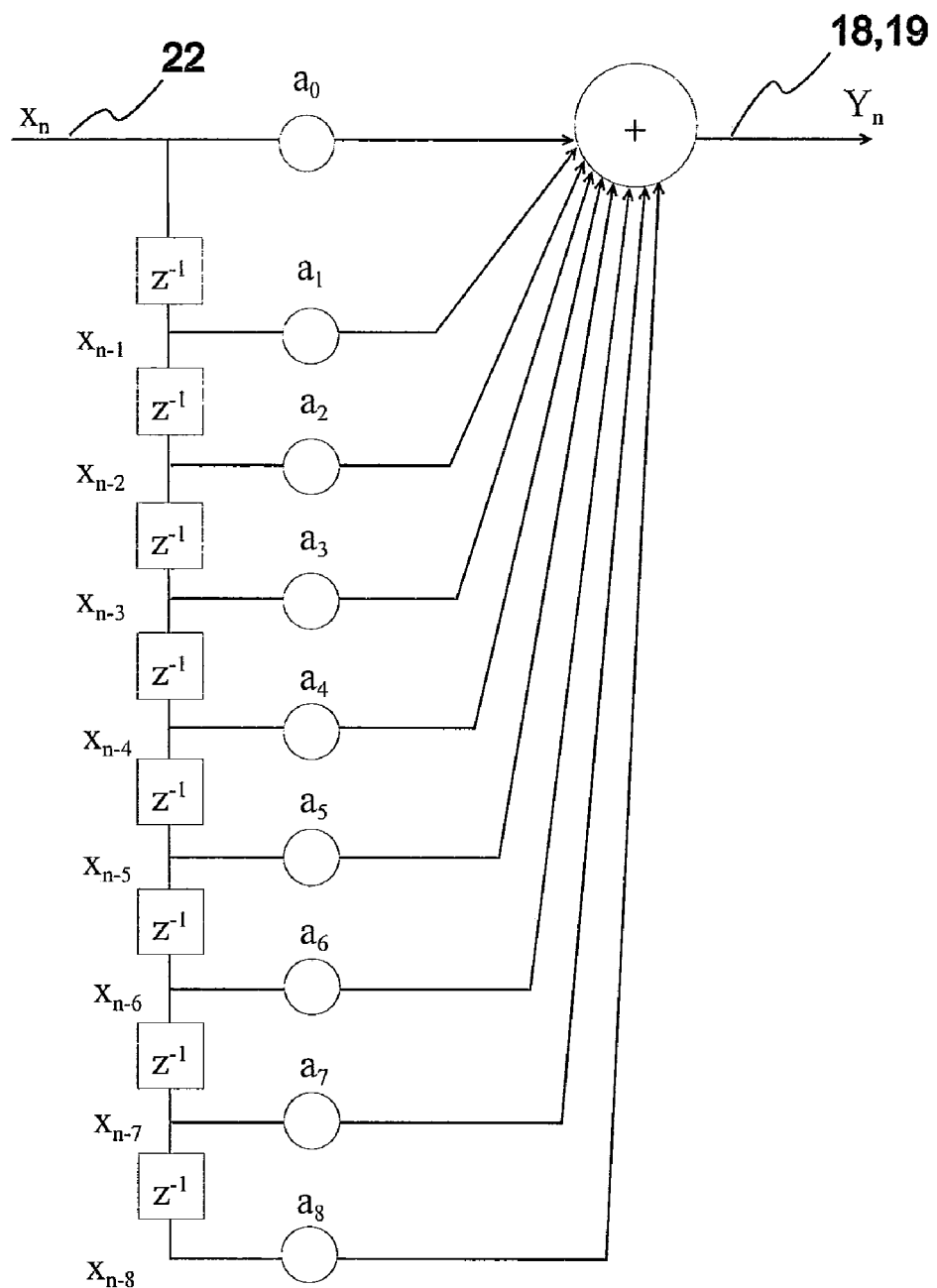
FIG. 3 represents a prior-art FIR filter

FIG. 2 presents a timing diagram for the method for determining an angle by means of a resolver 3. The topmost curve in the figure is the excitation signal (29), with which the measurement points, indicated by black spots on the response signal graph (13, 14), are synchronized. Synchronized with the excitation signal are also the computation points (23, 24, 25, 26). At each computation point, FIR filtering is computed using the computation buffer stored at the instant of time in question. For example, at computation instant (23) the sample buffer comprises the measurement points within the range indicated by arrow (16). In this embodiment, the sample buffer has a length equal to the excitation signal (29) cycle (17). In the method according to FIG. 2, the process of selection of the value set (19) to be used is as follows. First, FIR filtering is computed twice during an excitation signal cycle (17), i.e. first at computation point (23) and next at computation point (24). The computation results form a value set (18). After this, the computation points are shifted with respect to the excitation signal (29), in this case by the measurement interval (15). FIR filtering is computed at the new measurement points (25, 26) and a new set of values (19) is obtained. For these value sets (18, 19), the averages of the unsigned values in the value sets are computed, thus obtaining average (20) for value set (18) and average (21) for value set (19). By comparing the averages, the value set Amax having the highest (19) average is selected, and the computation points (25, 26) corresponding to value set Amax are stored in memory. After this, FIR filtering is computed repeatedly at the computation points (25, 26) corresponding to value set Amax (19), and angle data is determined repeatedly from these FIR filtered resolver response signals (19).

The invention has been described above with reference to a few embodiment examples. It is obvious to a person skilled in the art that the invention is not exclusively limited to the embodiments described above, but that many other embodiments are possible within the scope of the inventive concept defined in the claims.

The invention claimed is:

1. Method for determining an angle using a resolver having an input for an excitation signal and at least two outputs for response signals, the method comprising:

supplying an excitation signal of essentially constant frequency to the resolver;

measuring the resolver response signals at a measurement interval;

first computing Finite Impulse Response (FIR) filtering for computation points representing the measured response signal values at each measurement interval;

storing the first computation points and a set of corresponding computation result values calculated by said first computing in memory;

shifting each of said first computation points at least once relative to the excitation signal, storing the shifted computation points and a new set of values of computation results corresponding to the shifted computation points in memory;

comparing at least two sets of values of computation results to each other and selecting a value set that includes the highest computation result as an unsigned value from among said at least two sets of values;

second computing FIR filtering at predetermined computation points corresponding to the selected value set;

determining angle data from results of said second computing; and synchronizing each of said predetermined computation points with the excitation signal by defining a frequency of computations as the excitation signal frequency or as a multiple of the excitation signal frequency.

2. Method according to claim 1, wherein
said first computing FIR filtering includes computing FIR filtering at two computation points within a cycle time of the excitation signal for values present at an instant of computation in a sample buffer having a length at least equal to the excitation signal cycle time;

the method further comprising: computing averages in each set of values of computation results for unsigned values in the value set;

where said comparing at least two sets of clause includes comparing the computed averages; and where selecting a value set includes selecting the value set having the highest computed average.

3. Method according to claim 1, said FIR filtering including FIR band-pass filtering.

4. Method according to claim 2, said FIR filtering including FIR band-pass filtering.

5. Method according to claim 1, where said shifting includes shifting by the measurement interval.

6. Apparatus for determining an angle using a resolver, said apparatus comprising:
an excitation signal generator that generates an excitation signal of essentially constant frequency;
a response signal sampler;
a Finite Impulse Response (FIR) filter;
a computation determining unit that determines an instant of computation of FIR filtering,
a computation changing unit that changes the instant of computation of FIR filtering,
a memory that stores computation points and value sets created by computation of FIR filtering,
a comparator that compares unsigned values in the value sets,
a selector that selects a value set based on a comparison result from the comparator, and
a determiner of angle data that determines angle data based on the selected value set,
where each of the computation points is synchronized with the excitation signal by defining a frequency of computations as the excitation signal frequency or as a multiple of the excitation signal frequency.

7. Apparatus according to claim 6, the apparatus further comprising:
a controller, the controller including
a system clock,
a central processing unit,
a RAM memory,
a non-volatile program memory and
a non-volatile memory that stores the computation points of at least one value set,
a sampler and
an A/D converter.

8. Apparatus according to claim 7, wherein the central processing unit causes the controller to perform the functions of
the excitation signal generator,
the FIR filter,
the computation determining unit,
the computation changing unit,
the comparator,
the value set selector, and
the determiner of angle data, and
the RAM memory includes
the memory that stores the computation points, and
a sample buffer for the response signal sampler.

9. Apparatus according to claim 6, wherein the FIR filter is an FIR band-pass filter.

10. Apparatus according to claim 7, wherein the FIR filter is an FIR band-pass filter.

11. Apparatus according to claim 8, wherein the FIR filter is an FIR band-pass filter.

* * * * *